United States Patent [19]

Hayashi et al.

[11] Patent Number: 4,819,086
[45] Date of Patent: Apr. 4, 1989

[54] MULTIRECORDING METHOD ELIMINATING STRIPED-PATTERN INTERFERENCE

[75] Inventors: Hideki Hayashi; Tsutomu Honda, both of Saitama, Japan

[73] Assignee: Pioneer Electronic Corporation, Tokyo, Japan

[21] Appl. No.: 109,376

[22] Filed: Oct. 19, 1987

[30] Foreign Application Priority Data

Oct. 18, 1986 [JP] Japan ................................ 61-247999

[51] Int. Cl.$^4$ ............................................ H04N 5/95
[52] U.S. Cl. .................................. 358/343; 358/138; 358/330; 358/327
[58] Field of Search ............... 358/310, 328, 335, 340, 358/343, 330, 13, 12, 15, 138, 327, 329; 360/32, 19.1

[56] References Cited

U.S. PATENT DOCUMENTS

| | | | |
|---|---|---|---|
| 2,716,151 | 8/1955 | Smith | 358/12 |
| 2,838,597 | 6/1958 | Vrijer | 358/15 |
| 4,051,516 | 9/1977 | Weston | 358/13 |
| 4,065,784 | 12/1977 | Rossi | 358/13 |
| 4,227,204 | 10/1980 | Rossi | 358/13 |
| 4,554,596 | 11/1985 | Shibata et al. | 358/330 |
| 4,675,733 | 6/1987 | Tanimoto | 358/138 |
| 4,745,459 | 5/1988 | Ninomiya et al. | 358/138 |

FOREIGN PATENT DOCUMENTS 3545322  6/1987  Fed. Rep. of Germany.

OTHER PUBLICATIONS

Digitalie Signalverarbeitung von FM-Modulierten Signalen: by Demmer, Draheim & Gutsman, published Digitaltechnik NTZ Bd. 37(1984) Heft 7 pp. 414–419.
"Two Dimensional Analysis of Sub-Nyquist Sampling of NTSC Color TV Signals at 1.5 $f_{sc}$," by Achiha & Ishikura; published in Electronics and Communications in Japan, vol. 63-B, No. 6, 1980, pp. 43–50.
"Composite Television Coding: Subsampling of Interpolation," by Brainard, Netravali & Pearson, published in SMPTE Journal, Aug. 1982, pp. 717–724.

Primary Examiner—Donald McElheny, Jr.
Attorney, Agent, or Firm—Sughrue, Mion, Zinn, Macpeak & Seas

[57] ABSTRACT

A multirecording method in which a multiplex sub-Nyquist-sampling video signal is multirecorded together with a predetermined signal, such as a pilot or audio signal, with no generation of striped-pattern interference in the reproduced picture. In accordance with the invention, the frequency of the predetermined signal is set at m/(2n+1) times as high as the horizontal scanning frequency of the video signal, where n is a natural number of m is a natural number other than an integral multiple of (2n+1).

6 Claims, 5 Drawing Sheets

MULTIRECORDING METHOD ELIMINATING STRIPED-PATTERN INTERFERENCE

BACKGROUND OF THE INVENTION

The present invention relates to a multiple recording system.

A signal known as a MUSE signal is a multiplex sub-Nyquist sampling video signal corresponding to sampling values obtained by performing sampling a plurality of times so as to be mutually interpolated with a predetermined relation in sampling position between continued plural fields of a video signal. The MUSE signal is described in detail in an article entitled "—MUSE—A Transmission System for High Definition Television", published in NHK TECHNICAL REPORT, Vol. 27, No. 7.

For multirecording a MUSE signal together with another signal, there is known a system in which the frequency of a pilot synchronizing signal in an optical video disk is set to 135 $f_H/2$ ($f_H$ representing a horizontal scanning frequency) and the pilot signal is multirecorded on the optical video disk together with the MUSE signal. The system is described in detail in an article entitled "Signal Format of High Definition Optical Video Disk" published in ITEJ (the Institute of Television Engineers of Japan) TECHNICAL REPORT, Vol. 10, No. 4, VR 75-8 (May, 1986).

Next, a description will be given as to the signal format of the MUSE signal and interpolation processing performed in an MUSE decoder.

The MUSE signal is formed in such a manner that a chrominance signal in a sampled high-definition television signal is compressed in time and time-divisionally multiplexed on a luminance signal, and the thus-obtained time-division multiplex video signal is subsampled for every four fields to be converted into a narrow-band video signal for transmission. As seen in FIG. 8 showing a waveform of the MUSE signal on a transmission line, the chrominance signal C and the luminance signal Y, which are time-divisionally multiplexed with each other, are transmitted together with a synchronizing signal SYNC. Further, in the MUSE system, sub-Nyquist sampling having a subsampling pattern as shown in FIG. 9 is performed.

FIG. 9 shows the positional relation between sampling points in four continued fields. In the illustrated sampling position relation, a sampling value of the sampling point indicated by a white dot is transmitted in the 4f-th field (f being a natural number), a sampling value of a sampling point indicated by a white square is transmitted in the (4f+1)-th field, a sampling value of a sampling point indicated by a black dot is transmitted in the (4f+2)-th field, and a sampling value of a sampling point indicated by a black square is transmitted in the (4f+3)-th field. In FIG. 9, x represents a sampling point having no sampling value to be transmitted; d, a sampling interval; h, a scanning line interval; i, the horizontal scanning direction; and j, the vertical scanning direction. Further in this drawing, sampling values of sampling points which are encircled by a one-dot chain line and indicated by marks other than x are transmitted on a transmission line with the same timing within a horizontal scanning line.

At the receiving side, the MUSE signal is interpolated to thereby restore the time-division multiplex signal. Then, the luminance signal and the chrominance signal are separated from the time-division multiplex signal, and the chrominance signal is expanded in time to thereby restore the high-definition television signal.

The interpolation methods differ from each other between a still picture and and a moving picture, and between a luminance signal and a chrominance signal. FIG. 10 shows the interpolation method in the case of a still picture reproducing mode of a luminance signal. In FIG. 10, the marks represent the same meanings as those of the marks of FIG. 9.

With a picture sampling value of a sampling point of coordinates (i,j) before interpolation stored in a frame memory of a MUSE decoder and a picture sampling value of the sampling point of coordinates (i,j) after interpolation represented by A and B, respectively, the interpolation method of FIG. 10 is represented by the following expression (1):

$$B(i,j) = -(1/8)\{A(i-1,j-1) + A(i+1,j-1) + A(i-1,j+1) + A(i+1,j+1)\} + (3/2)A(i,j) + (1/4)\{A(i,j-1) + A(i,j+1) + A(i+1,j) + A(i-1,j)\} \quad (1)$$

As seen from FIG. 10, the method of obtaining a sampling value B(i,j) of a sampling point of coordinates (i,j) having a sample to be transmitted is different from that of obtaining a sampling value B(i,j) of a sampling point of coordinates (i,j) having no sample to be transmitted. However, a sampling value A(i,j) of a sampling point having no sample to be transmitted, which is indicated by x in the drawing, is zero in the frame memory, and therefore the two foregoing methods can be commonly represented by the expression (1).

As described above, in the MUSE system, the transmitted picture sampling values are rearranged as shown in FIG. 9, and interpolation as shown in FIG. 10 is performed. Therefore, the temporal change of a signal waveform on a transmission line does not coincide with the change of luminance or chrominance depending on the position of a picture element on a reproduced picture scene, and the picture sampling values which are stored in the frame memory adjacent to each other are mutually influenced because of interpolation. In the case where a disturbance component is superimposed on the MUSE signal on the transmission line, in view of the manner in which the disturbance is manifest in the reproduced picture, it is necessary to consider the manner of conversion of the transmitted waveform into the reproduced picture.

In the foregoing conventional system in which the MUSE signal is multirecorded by frequency division on an optical video disk together with a pilot having a frequency of 135 $f_H/2$. Because of imperfections in the characteristics of the optical modulator used in recording, asymmetry of the pits forming the recording tracks, and the like, the pilot component can be mixed with the MUSE signal. Due to such mixing, the pilot components of sampling points can have levels as shown in FIG. 11. (A calculation method of obtaining the levels of FIG. 11 will be described latter.) In FIG. 11, white dots represent the fact that the pilot component has a positive level, and a black dot represents the fact that the pilot component has a negative level. Further, the diameter of each of the white and black dots corresponds to the level of each of the pilot components.

After interpolation, the levels of the pilot components of the sampling points are changed as shown in FIG. 12. (Also, a calculation method of obtaining the levels of FIG. 12 will be described latter.) In FIG. 12, a sampling point indicated by a white dot appears white on the reproduced picture because the level of the luminance signal is positive, while, on the other hand, a sampling point indicated by a black dot appears black in the picture because the level of the luminance signal is negative. Therefore, in the conventional multirecording system, there is a disadvantage that a stripe-like disturbance is generated in the reproduced picture, as shown in FIG. 12, and as a result the quality of the reproduced picture is deteriorated.

SUMMARY OF THE INVENTION

It is therefore an object of the present invention to eliminate the foregoing disadvantages in the prior art.

It is another object of the present invention to provide a multirecording method in which a multiplex sub-Nyquist-sampling video signal is multirecorded together with a predetermined signal without generating any striped disturbance in the reproduced picture.

The multirecording method according to the present invention is characterized in that the frequency of a signal to be multirecorded by frequency division on a recording medium together with a multiplex sub-Nyquist-sampling video signal is set to be $m/(2n+1)$ times as high as the horizontal scanning frequency (n being a natural number and, m being a natural number other than integral multiples of $(2n+1)$).

BRIEF DESCRIPTION OF THE DRAWINGS

The above and other objects of the present invention will be apparent from following detailed description taken in conjunction with the accompanying drawings, in which.

DESCRIPTION OF THE PREFERRED EMBODIMENTS

Referring to FIG. 1 through 7, a preferred embodiment of the present invention will be described hereunder.

Figure 1:
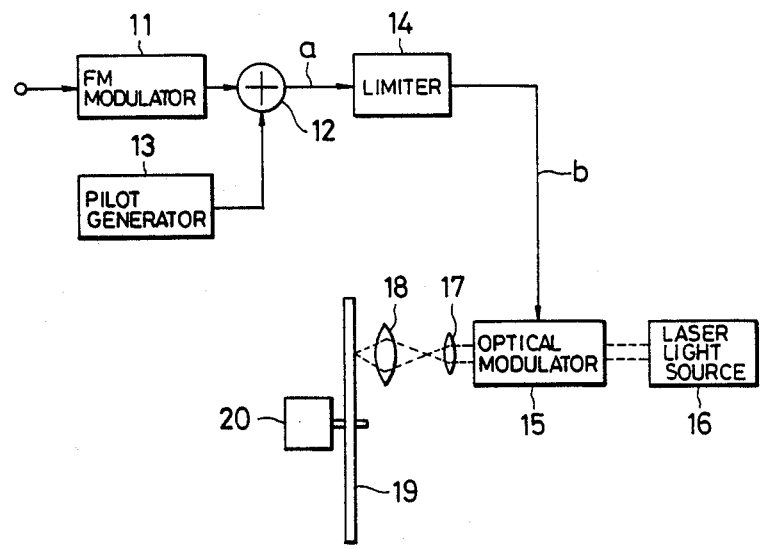
FIG. 1 is a block diagram showing a recording apparatus according to the present invention.

In FIG. 1, an MUSE signal is applied to an FM modulator 11. The output FM signal from the FM modulator 11 is applied to an adder 12 so as to be combined with or added to the pilot signal produced by the pilot generator 13. The pilot generator 13 is arranged so as to generate a pilot signal having a frequency $m/(2n+1)$ times as high as the horizontal scanning frequency $f_H$ (n being a natural number, being a natural number other than integral multiples of $(2n+1)$), for example, by using a PLL frequency synthesizer, Taking the circuit scale of the PLL frequency synthesizer into consideration, it is preferable to set n to a small value.

The output a of the adder 12 is applied to a limiter 14 so as to limit the amplitude of the output a so that a shaped rectangular waveform of the addition output of the adder 12 is outputted from the limiter 14. The output b of the limiter 14 is applied to an optical modulator 15 so as to control the transmission factor of the optical modulator 15. As a result, laser light emitted from the laser light source 16 is intensify-modulated by the optical modulator 15, enlarged by a collimating lens 17, and converted by a condenser lens 18 into a light spot of about 1 μm diameter on a recording surface of a master disk 19 to expose a photoresist or the like constituting the recording surface of the master disk 19.

The master disk 19 is rotated at a predetermined rotational speed while being displaced at a rate of about 2 μm per rotation of the master disk 19 by a motor 20 and a servo loop (not shown).

Figure 2:
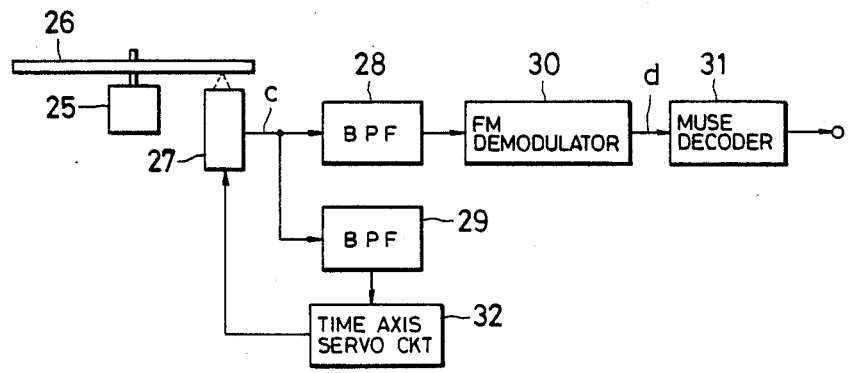
FIG. 2 is a block diagram showing a reproducing apparatus for reproducing information recorded in the recording apparatus of FIG. 1.

A track on the recording surface of the master disk 19 carrying information recorded as described above, or a track on a recording surface of a duplicate disk obtained by molding a plastic material in a metal mold which is formed to transform the master disk 19 to the duplicate disk, is constituted by rows of recesses called pits. Referring to FIG. 2, a description will be given as to an apparatus for reproducing information from the master disk or the duplicate disk.

In FIG. 2, information recorded on a disk 26 driven to rotate by a spindle motor 25 is read by an optical pickup 27 provided with a laser diode, an objective lens, a focus actuator, a tracking actuator, a tangential actuator, a photodetector, etc. The output c of the pickup 27 is applied to BPFs (bandpass filters) 28 and 29 as well as to a focus servo circuit (not shown) and a tracking servo circuit (not shown). Laser light emitted from the laser diode carried by the pickup 27 is focused on a recording surface of the disk 26 by the focus servo circuit so as to form an information detecting light spot, and this light spot is position-controlled in the radial direction of the disk 26 by the tracking servo circuit so as to be positioned on a track of the disk 26.

In the BPF 28, a video RF signal is separately extracted from the output of the pickup 27 so as to be applied to an FM demodulator 30. In this FM demodulator 30, the MUSE signal is demodulated so as to be applied to an MUSE decoder 31. In the MUSE decoder 31, the MUSE signal is subject to interpolation processing. The output of this MUSE decoder 31 is sent to a monitor or the like as a high-definition television signal.

In the BPF 29, on the other hand, a pilot is separately extracted from the output of the pickup 27 and applied to a time-axis servo circuit 32. In the time-axis servo circuit 32, the phase of the pilot is compared with that of a reference signal to thereby generate a time-axis error signal. The time-axis error signal is applied to the pickup 27 so as to drive the tangential actuator for displacing the information detecting light spot in the circumferential direction of the disk 26 so as to correct time-axis error.

FIGS. 3A–3D show signal spectra of the signals at various points in of the foregoing recording and reproducing apparatus. In these figures, for the sake of better understanding, signal spectra are shown upon reception of no MUSE signal.

Figure 3A:
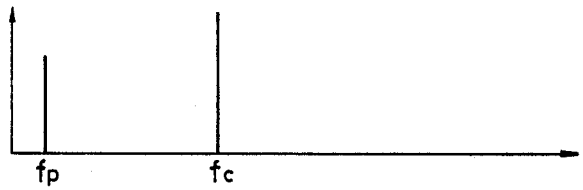
FIGS. 3A-3D are drawn to diagram showing signal spectra of signals at various points in of the apparatus of FIGS. 1 and 2.
Figure 3B:
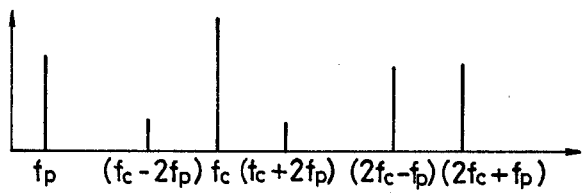
Figure 3C:
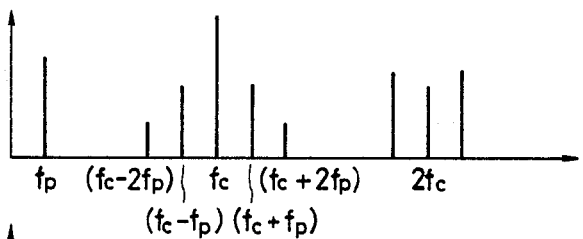
Figure 3D:
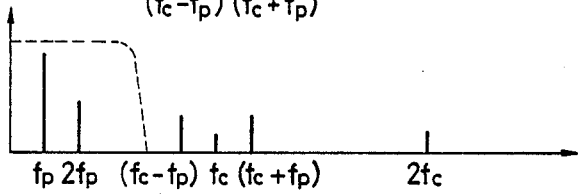

As shown in of FIG. 3A, the output a of the adder 12 is composed of a carrier component $f_C$ and a pilot component $f_P$. In the limiter 14 to which the output a of the adder 1 is applied, odd-order intermodulation components $f_C \pm 2f_P$ and $2f_C \pm f_C$ are generated. FIG. 3B shows a signal spectrum of the output b of the limiter 14. Further, in the output c of the pickup 27, even-order intermodulation components $f_C \pm f_P$ or $2f_C$ as shown in FIG. 3C are generated because of imperfections in the characteristics of the optical modulator 15, asymmetry of the pits forming the recording track, etc. As a result, in the demodulated output d of the FM demodulator 30, as shown of FIG. 3D, an $f_P$ component generated by demodulation of $f_C \pm f_P$ and a $2f_P$ component generated by demodulation of $f_C \pm 2f_P$ are mixed into a base band of the MUSE signal shown by a broken line. The reproduced picture is disturbed by the $f_P$ component. It may be considered to directly add the disturbance component $f_P$ to the MUSE baseband signal so as to be equivalent to the MUSE base band signal. However, it is necessary to consider the fact that the influence of this $f_P$ component on the reproduced picture depends on the rearrangement of the picture sampling values to be transmitted and conversion of the same by interpolation.

It is assumed that $n=1$ and $m=200$. Then, since $f_P=200 f_H/3$, the angle $\theta_H$ by which the phase of the $f_P$ component rotates in the course of a period $t_H$ is obtained through the following expression (2):

$$\begin{aligned}\theta_H &= 2\pi \cdot f_P \cdot t_H \\ &= 2\pi \cdot (200/3)f_H \cdot (1/f_H) \\ &= 2\pi \cdot (200/3)\end{aligned} \qquad (2)$$

where $t_H$ is a period of 1H.

Figure 9:
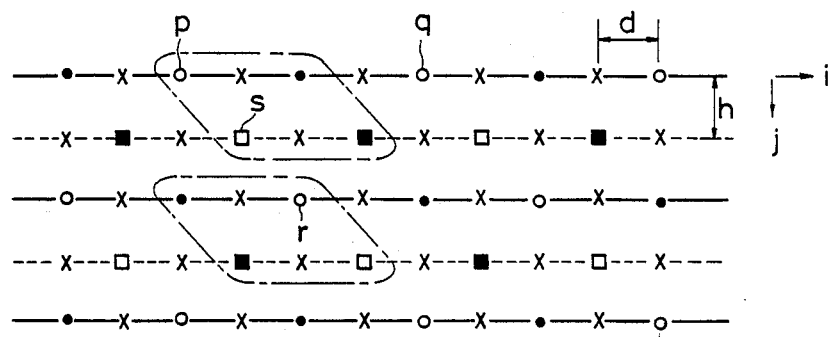
FIG. 9 is a diagram showing the sampling pattern in the MUSE system.
Figure 10:
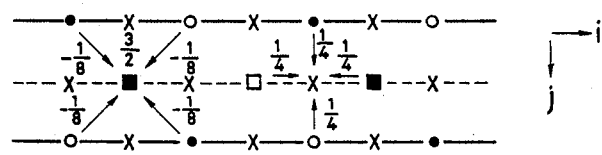
FIG. 10 is a diagram used for explaining the interpolation processing method in the MUSE system.

In FIG. 9, a point p is separated from a point q by 4 d in the direction i. The period of 1H of the MUSE signal is equal to 1920 d, and therefore the distance 4 d corresponds to $t_H/480$ in time. Consequently, the phase rotational angle $\theta_q$ of an $f_P$ component of the point q when viewed from the point p is obtained through the following expression (3):

$$\begin{aligned}\theta_q &= 2\pi \cdot f_P \cdot t_H/480 \\ &= 2\pi \cdot (200/3) \cdot (1/480)\end{aligned} \qquad (3)$$

Further, in FIG. 9, the point p is separated from a point r by 2 h in the direction j. The point p and r are the same in timing on the horizontal scanning line, so that the distance 2 h corresponds to $t_H$ in time. As a result, the phase rotational angle $\theta_r$ of an $f_P$ component of the point r when viewed from the point p is obtained through the following expression (4).

$$\begin{aligned}\theta_r &= 2\pi \cdot f_P \cdot t_H \\ &= 2\pi \cdot (200/3)\end{aligned} \qquad (4)$$

Therefore, the phase rotational angle $\theta$ of the $f_P$ component of a point which is separated from the point p by $k_2 \cdot 2h$ in the direction j and by $k_1 \cdot 4d + (k_2 \bmod 2) \cdot 2d$ in the direction i ($k_1$ and $k_2$ being integer s, and ($k_2 \bmod 2$) being the remainder when $k_2$ is divided by 2) is obtained by the following expression (5):

$$\theta = 2\pi \cdot (200/3) \cdot \{(k_1/480) + k_2\} \qquad (5)$$

Further, a difference in level of the $f_P$ component between these two points is obtained by $\cos \theta$.

Therefore, the level $A_1(i,j)$ of the $f_P$ component of a sampling point in the 4f-th field indicated by the white dot in FIG. 9 is represented by the following expression (6):

$$\begin{aligned}A_1(i,j) &= A(4k_1 + (k_2 \bmod 2) \cdot 2, 2k_2) \\ &= \cos \theta\end{aligned} \qquad (6)$$

The angle $\theta$ is obtained through the expression (5).

The point p, which is a sampling point in the 4f-th field, and a point s, which is a sampling point in the (4f+1)-th field, are the same in timing on the horizontal scanning line; however, the point p is separated from the point s by 563 $t_H$ in time because the 4f-th field is separated from the (4f+1)-th field by 563H. Therefore, the phase rotational angle $\theta_S$ of the $f_P$ component of the point when viewed from the point p is obtained through the following expression (7):

$$\begin{aligned}\theta_s &= 2\pi \cdot f_P \cdot 563t_H \\ &= 2\pi \cdot (200/3) \cdot 563\end{aligned} \qquad (7)$$

Therefore, the level $A_2(i,j)$ of an $f_P$ component of a sampling point in the (4f+1)-th field is represented by the following expression (8).

$$\begin{aligned}A_2(i,j) &= A(4k_1 + 1 + (k_2 \bmod 2) \cdot 2, 2k_2 + 1) \\ &= \cos \{\theta + 2\pi \cdot (200/3) \cdot 563\}\end{aligned} \qquad (8)$$

The angle $\theta$ is obtained through the expression (5).

The 4f-th field is separated from the (4f+2)-th field by 1125H and from the (4f+3)-th field by 1688H. Therefore, similarly to the foregoing cases, the levels $A_3(i,j)$ and $A_4(i,j)$ of $f_P$ components of sampling points in the (4f+2)-th field and the (4f+3)-th field are represented by the following expressions (9) and (10), respectively:

$$A_3(i,j) = A(4k_1 + 2 - (k_2 \bmod 2) \cdot 2, 2k_2) \quad (9)$$
$$= \cos\{\theta + 2\pi \cdot (200/3) \cdot 1125\}$$

$$A_4(i,j) = A(4k_1 + 3 - (k_2 \bmod 2) \cdot 2, 2k_2 + 1) \quad (10)$$
$$= \cos\{\theta + 2\pi \cdot (200/3) \cdot 1688\}$$

The angle $\theta$ is obtained through the expression (5).

Figure 4:
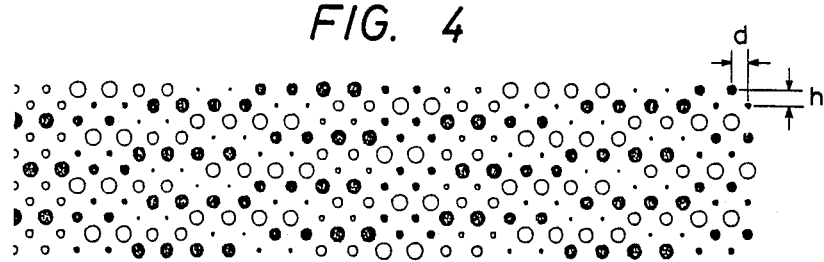
FIG. 4 is a diagram showing levels of pilot components $f_p$ before interpolation processing in the MUSE system is performed with respect to sampling points in the case where $f_p = 200 f_H/3$.

FIG. 4 shows the levels of the $f_P$ components of the sampling points represented by the expressions (6), (8), (9) and (10). In FIG. 4, a white dot represents the fact that the $f_P$ component has a positive level, and a black dot represents the fact that the $f_P$ component has a negative level. The diameter of each of the white and black dots corresponds to the level of the $f_P$ component of each of the respective sampling points.

Figure 5:
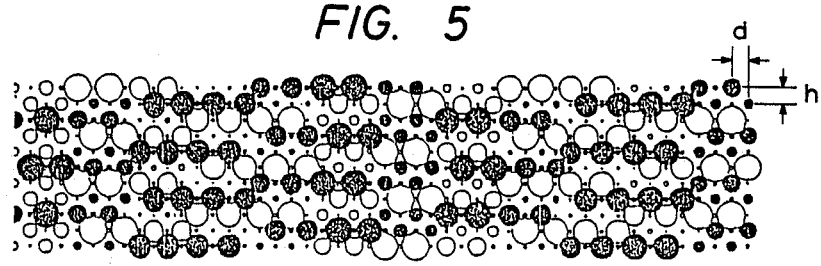
FIG. 5 is a diagram showing levels of $f_P$ components after interpolation processing in the MUSE system has been performed with respect to the sampling point in the case where $f_P = 200 f_H/3$.

The level of the $f_P$ component of each of the sampling points is changed by interpolation. For example, FIG. 5 shows the levels of the sampling points in the case where the interpolation is performed in a still picture reproducing mode of a luminance signal. In FIG. 5, the marks represent the same meanings as those in FIG. 4.

In FIG. 5, a sampling point shown by a white dot appears white in the reproduced picture because the level of the luminance signal is positive, while on the other hand, a sampling point shown by a black dot appears black because the level of the luminance signal is negative. Therefore, when $f_P=200\ f_H/3$, no striped disturbance appears in the reproduced picture, and therefore the picture quality is prevented from being deteriorated.

Next, assuming that $n=2$ and $m=336$, $f_P=336\ f_H/5$. Therefore the levels $A_1(i,j)$ through $A_4(i,j)$ of the $f_P$ components of the sampling points in the 4f-th through the (4f+3)-th fields are represented by the following expression (11), (12), (13) and (14), below.

FIG. 4 shows the levels of the $f_P$ components of the sampling points represented by the expressions (6), (8), (9) and (10). In FIG. 4, a white dot represents the fact that the $f_P$ component has a positive level, and a black round represents the fact that the $f_P$ component has a negative level. The diameter of each of the white and black dots corresponds to the level of the $f_P$ component of each of the sampling points.

The level of the $f_P$ component of each of the sampling points is changed by interpolation. For example, FIG. 5 shows the levels of the sampling points in the case where interpolation is performed in a still picture reproducing mode of a luminance signal. In FIG. 5, marks represent the same meanings as those in FIG. 4.

In FIG. 5, a sampling point shown by a white dot appears white in the reproduced picture because the level of the luminance signal is positive, while, on the other hand, a sampling point shown by a black dot is black in the picture because the level of the luminance signal is negative. Therefore, when $f_P=200\ f_H/3$, no striped disturbance appears in the reproduced picture, and therefore the picture quality is prevented from being deteriorated.

Next, assuming that $n=2$ and $m=336$, $f_P=336\ f_H/5$. Therefore, the levels $A_1(i,j)$ of the $f_P$ components of sampling points in the 4f-th through the (4f+3)-th fields are represented by the following expressions (11), (12), (13) and (14), respectively:

$$A_1(i,j) = A(4k_1 + (k_2 \bmod 2) \cdot 2, 2k_2) \quad (11)$$
$$= \cos\theta$$

$$A_2(i,j) = A(4k_1 + 1 + (k_2 \bmod 2) \cdot 2, 2k_2 + 1) \quad (12)$$
$$= \cos\{\theta + 2\pi \cdot (336/5) \cdot 563\}$$

$$A_3(i,j) = A(4k_1 + 2 - (k_2 \bmod 2) \cdot 2, 2k_2) \quad (13)$$
$$= \cos\{\theta + 2\pi \cdot (336/5) \cdot 1125\}$$

$$A_4(i,j) = A(4k_1 + 3 - (k_2 \bmod 2) \cdot 2, 2k_2 + 1) \quad (14)$$
$$= \cos\{\theta + 2\pi \cdot (336/5) \cdot 1688\}$$

Figure 6:
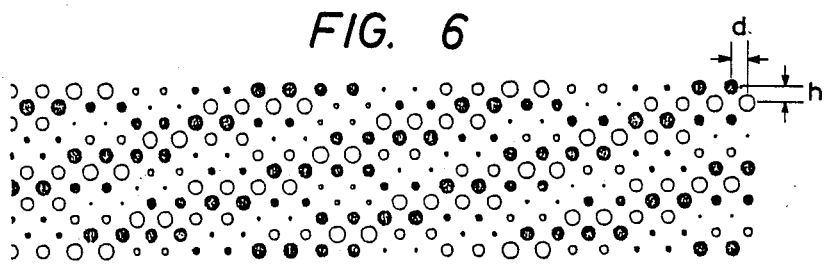
FIG. 6 is a diagram showing levels of $f_P$ components before interpolation processing in the MUSE system is performed with respect to the sampling points in the case where $f_P = 336 f_H/5$.
Figure 7:
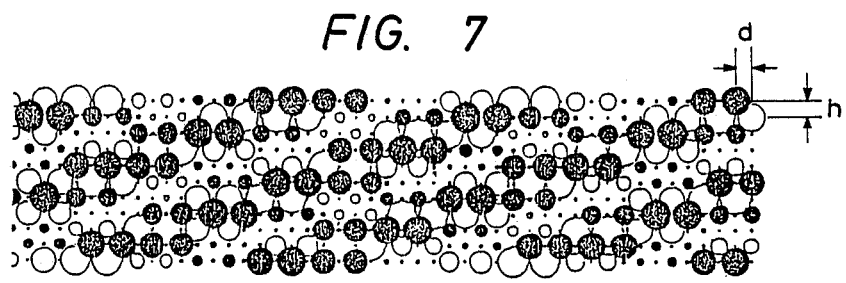
FIG. 7 is a diagram showing levels of the $f_P$ components after interpolation processing in the MUSE system has been performed with respect to the sampling points in the case where $f_P = 336 f_H/5$.
Figure 8:
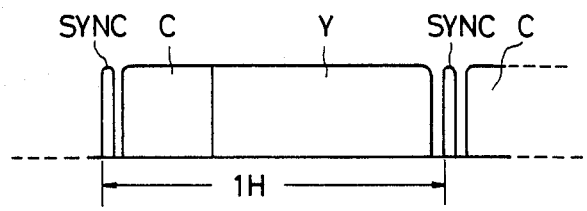
FIG. 8 is a diagram showing the waveform of the MUSE signal on a transmission line.

FIG. 6 shows the levels of the $f_P$ components of the sampling points represented by the expressions (11) through (14). Further, the level of the $f_P$ component of each of the sampling points is changed by interpolation. FIG. 7 shows the levels of the sampling points in the case where interpolation is performed in a still picture reproducing mode of a luminance signal. As seen from FIG. 7, also when $f_P=336\cdot f_H/5$ (Hz), no striped disturbance appear in the reproduced picture, and therefore the picture quality is prevented from being deteriorated.

Figure 11:
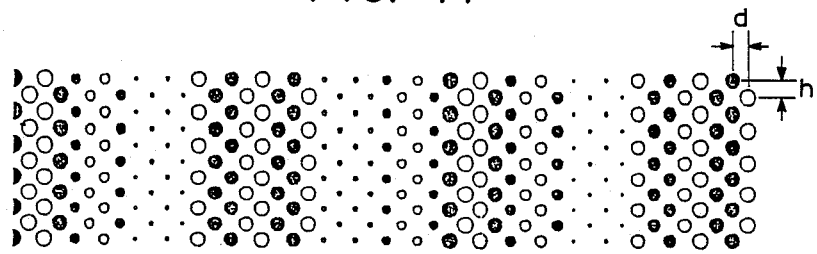
FIG. 11 is a diagram showing levels of $f_P$ components before interpolation processing in the MUSE system is performed with respect to sampling points in the case where multirecording is performed by the conventional system.
Figure 12:
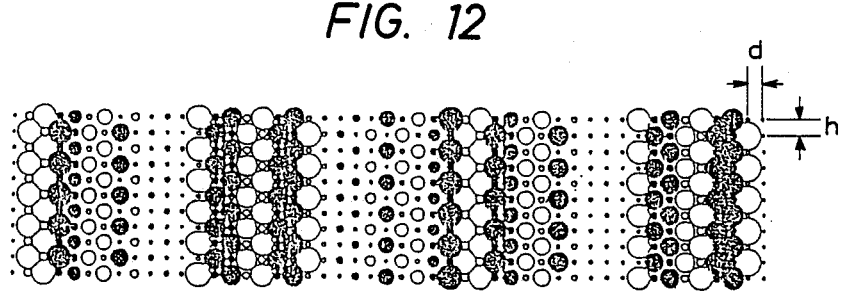
FIG. 12 is a diagram showing levels of the $f_P$ components after interpolation processing in the MUSE system has been performed with respect to the sampling points in the case where multirecording is performed by the conventional system.

Thus, the reason why a stripe pattern becomes inconspicuous when the relation $f_p=mf_H/(2n+1)$ is established is that the difference in phase of the $f_P$ component between two sampling points separated from each other $k_2 \cdot 2h$ in the direction i is not an integral multiple of $2\pi$ and the phases of the two sampling points do not coincide with each other, as seen from a comparison between FIGS. 4 and 11.

Although a description has been made as to the case where the MUSE signal is multirecorded on an optical video disk together with the pilot in the foregoing embodiment, the present invention is not limited to such an embodiment but can be applied to the case where the MUSE signal is multirecorded together with a signal other than the pilot, for example, an audio signal. Further, the present invention can be applied to an FM-modulation recording/reproducing system using a recording medium other than an optical video disk, for example, a VTR recording/reproducing system, and the same results as those of the case of using an optical video disk can be obtained. Further, it is considered that disturbance generated when multirecording is performed in a VTR recording/reproducing system is caused by even-order distortion or even-order intermodulation in an FM transmission system including a tape-head system.

Although RF multirecording in which the pilot is mixed with the RF signal obtained by FM-modulating the MUSE signal and the thus-obtained multiplex signal is recorded is performed in the foregoing embodiment, the present invention can be applied to the case of baseband multirecording in which a burst signal for synchronization is mixed with the MUSE signal and the thus-obtained multiplex signal is FM-modulated and recorded.

As described above in detail, in the multi-recording system according to the present invention, the frequency of a predetermined signal to be multirecorded on a recording medium together with a multiplex sub-Nyquist-sampling video signal is set to be $m/(2n+1)$ times as high as a horizontal scanning frequency (n being a natural number, being a natural number other than integral multiples of 2n+1). Therefore, the phases of the predetermined signal at the sampling points corresponding to mutually corresponding positions on two horizontal scanning lines constituting a reproduced picture obtained by the multiplex sub-Nyquist-sampling video signal do not coincide with each other, and therefore striped disturbance is prevented from occurring.

What is claimed is:

1. In a multirecording method in which a multiplex sub-Nyquist-sampling video signal corresponding to sampling values obtained by performing sampling a plurality of times as to be mutually interpolated with a predetermined relation in sampling position between continued plural fields of video signals is multirecorded on a recording medium together with a predetermined signal, the improvement in which a frequency of said predetermined signal is set to be $m/(2n+1)$ times as high as a horizontal scanning frequency of said video signal, n being a natural number, and m being a natural number other than integral multiples of $(2n+1)$.

2. The multirecording method according to claim 1, in which n is 1 and m is 200.

3. The multirecording method according to claim 1, in which said predetermined signal is a pilot signal for correcting a time-axis error.

4. The multirecording method according to claim 1, in which said predetermined signal is an audio signal.

5. The multirecording method according to claim 1, in which said recording medium is an optical video disk.

6. The multirecording method according to claim 1, in which said multiplex sub-Nyquist-sampling video signal is frequency-modulated.

* * * * *